Jan. 23, 1934.                    O. L. OLSEN                    1,944,826
                            VALVE ACTUATING MECHANISM
                            Original Filed Sept. 2, 1925
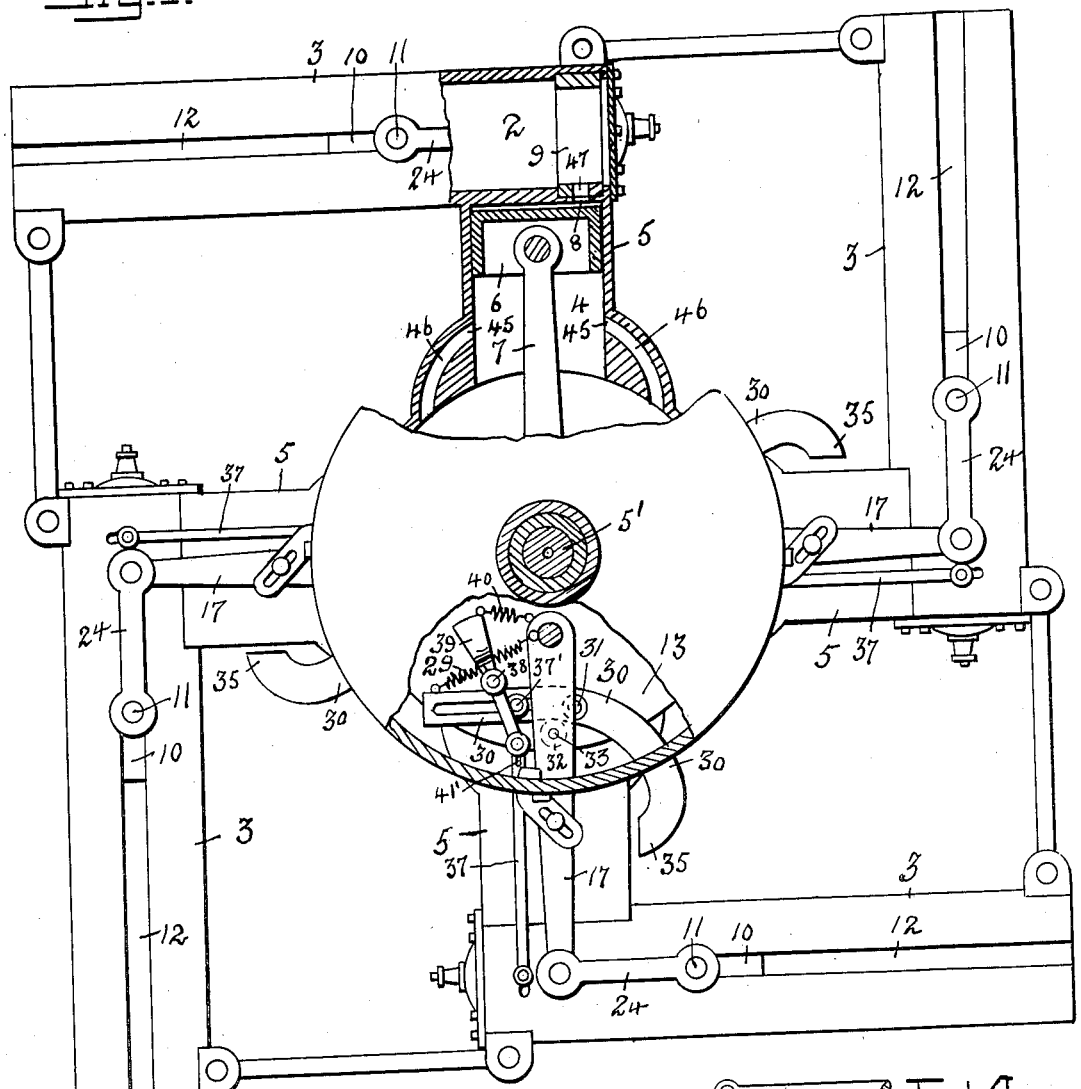
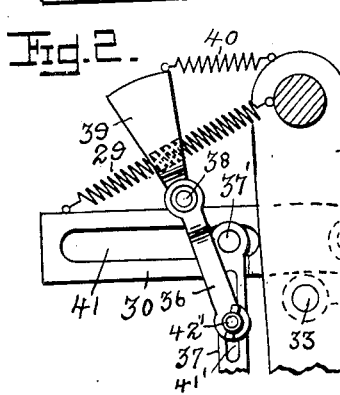
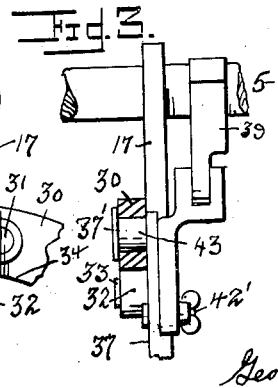
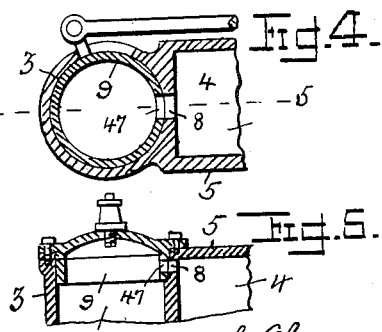
O. L. Olsen
INVENTOR.
Geo. Wedderburn, atty Patented Jan. 23, 1934

1,944,826

UNITED STATES PATENT OFFICE 1,944,826

VALVE ACTUATING MECHANISM

Oleander L. Olsen, Fairview, Mont.

Original application September 2, 1925, Serial No. 133,274. Divided and this application April 20, 1929. Serial No. 356,770

11 Claims. (Cl. 123—114)

This invention relates to improvements in a valve control mechanism for that type of engine more particularly disclosed in my application for patent, Serial #133,274, filed September 2, 1925, and has for its object to provide a governor for controlling the movement of an oscillating sleeve valve.

Another object of the invention is to provide an automatic governor control for a valve.

A still further object of the invention is to provide in a valve mechanism means whereby the movement of the valve may be regulated and automatically controlled in order that it will operate at predetermined speed.

With the above and such other objects in view as may hereinafter more fully appear, I have invented the device shown in the accompanying drawing in which:

Figure 1 is a diagrammatic showing of an internal combustion engine, embracing my invention;

Figure 2 is an enlarged detail of a governor control;

Figure 3 is an edge view thereof;

Figure 4 is a sectional view of an explosion chamber having an oscillating sleeve valve operating therein; and Figure 5 is a section on line 5—5 of Figure 4.

Like reference characters indicate like parts throughout the following specification, and in the several views in the drawing in which there is provided an explosion chamber 2, incorporated within the cylinder 3, and a secondary chamber 4, incorporated within the cylinder 5; the chamber 4 being, as will hereinafter be brought out, a compression and feed chamber for the explosion chamber 2, and the chambers 2 and 4 being set at right angles to each other, the chamber 4 being radial to the crank shaft 5'; there being carried within the chamber 4 a piston 6, connected by a pitman 7, with the crank shaft 5'. Interconnecting the chambers 2 and 4 is a conduit 8, the conduit 8 being suitably closed and opened at predetermined times by an annular oscillating valve 9. Carried within the chamber 2 is a piston 10 provided with a wrist pin 11 reciprocating within a slot 12 in the side wall of the cylinder 3, through which pin the piston is operated, by means of a link 24 driven by an arm 17.

As a means for returning the arm 17 to its normal position after an explosion, I provide a recoil spring 29, connected with a cam lever 30 which cam lever 30 is pivotally mounted at 31 to the shell 13; and there is further provided a roller 32, journalled by a stub shaft 33 upon the arm 17, which operates upon the cam surface 34 and the movement of which is limited by a hook-like terminal 35 so that, upon the movement of the arm 17, in a counter clockwise direction, the cam lever 30, by the action of the roller 32, will move likewise in a counter clockwise direction upon its pivotal axis 31, against the yielding of the spring 29; and when the piston 10 has reached the limit of its explosion stroke and an exhaust of the gases in the explosion chamber has taken place, the force of the spring 29, on the recoil will automatically cause the cam face 34 to operate against the roller 32, to return the arm 17 to its normal position.

Connected with the cam lever 30, is a centrifugal governor 36, interconnected with a control rod 37, the control rod 37 connected with the valve 9, the connection being in the following manner; the governor element 36 is pivotally mounted at 38, and is provided with a weight 39, and yieldingly held in a predetermined position by a coil spring 40. The connecting rod 37 is provided with a slot 41' in which slidably moves a pin 42' carried by the governor element 36, the terminal of the rod 37 carrying also a pin 37' on which is a roller 43, slidably movable in the slot 41 in the cam arm 30, whereby upon the oscillation of the governor 36, by reason of the centrifugal action overcoming the yielding of the spring 40 at varying speeds, the rod 37 assumes a different radius relative to the pivotal axis 31 of the cam lever 30, thereby shortening and lengthening the stroke of the rod 37, by the action of the roller 43 in the slot 41, so that, when the tension of the spring 40 is set to a predetermined degree, the amount of opening of the exhaust is automatically regulated.

Carried at the inner terminal of the cylinder 5, are inlet ports 45, leading from conduits 46 the conduits 46 opening from internal of the shell 13. The location of the ports 45 is predetermined in relation to the stroke of the piston 6, so that when the piston 6 has reached a predetermined position, fuel is forced into the chamber 4, automatically, by the vacuum which has been created, due to the inward or suction stroke of the piston, and which fuel is automatically compressed upon the return stroke of the piston and forced within the explosion chamber 2, through ports 8 and valve ports 47 of valve 9.

Having described my invention that which I claim to be new, and desire to procure by Letters Patent is:

1. In combination, a valve, a rocker arm, a lever pivotally mounted adjacent the rocker arm, a link connecting the lever and valve, oscillating contrifugal means for varying the link in its relation to the lever.

2. In combination, a valve, a rocker arm, a lever pivotally carried adjacent the rocker arm, a link connecting the valve and rocker arm, and means including a centrifugal governor for varying the angularity of the link and lever.

3. An oscillating valve having a pin fixed thereto, a link pivoted to the pin, and a cam lever to which the link is movably connected, a rocker arm controlling the lever.

4. An oscillating valve having a pin fixed thereto, a link pivoted to the pin, a cam lever to which the link is movably connected, a rocker arm controlling the lever, and a governor for varying the angularity of the link and lever.

5. The device as claimed in claim 4, said governor being centrifugally controlled.

6. The device as claimed in claim 4, said governor being centrifugally controlled, said governor having a pin and slot connection with said link.

7. An oscillating valve having a pin fixed thereto, a link pivoted to the pin, a cam lever to which the link is movably connected, a rocker arm controlling the lever, a governor for varying the angularity of the link and lever, said governor being centrifugally controlled, said governor having a pin and slot connection with said link, and a spring connection between the governor and rocker arm.

8. The device as claimed in claim 7, said lever having an arcuate surface.

9. The device as claimed in claim 7, said lever having an arcuate surface, said rocker arm having a roller operating upon said surface.

10. The device as claimed in claim 7, said lever having an arcuate surface, said rocker arm having a roller operating upon said surface, said governor having a roller operating upon said lever.

11. The device as claimed in claim 7, said lever having an arcuate surface, said rocker arm having a roller operating upon said surface, said governor having a roller operating upon said lever, said lever being spring controlled.

OLEANDER L. OLSEN.